US012733644B2

(12) United States Patent
Bletsky et al.

(10) Patent No.: US 12,733,644 B2
(45) Date of Patent: Sep. 15, 2026

(54) METHODS FOR CONTROLLING FUSARIUM WILT OF BANANA PLANTS

(71) Applicant: MUSTGROW BIOLOGICS CORP., Saskatoon (CA)

(72) Inventors: Colin Bletsky, Saskatoon (CA); Corey Giasson, Corman Park (CA); Todd Lahti, Saskatoon (CA); David Maenz, Saskatoon (CA)

(73) Assignee: MUSTGROW BIOLOGICS CORP., Saskatoon (CA)

( * ) Notice: Subject to any disclaimer, the term of this patent is extended or adjusted under 35 U.S.C. 154(b) by 440 days.

(21) Appl. No.: 18/039,266

(22) PCT Filed: Nov. 30, 2021

(86) PCT No.: PCT/CA2021/051710
§ 371 (c)(1),
(2) Date: May 29, 2023

(87) PCT Pub. No.: WO2022/109755
PCT Pub. Date: Jun. 2, 2022

(65) Prior Publication Data

US 2024/0298645 A1 Sep. 12, 2024

Related U.S. Application Data

(60) Provisional application No. 63/119,299, filed on Nov. 30, 2020.

(51) Int. Cl.

| | |
|---|---|
| ***A01N 47/48*** | (2006.01) |
| ***A01N 47/46*** | (2006.01) |
| ***A01N 51/00*** | (2006.01) |
| ***A01N 63/50*** | (2020.01) |
| ***A01N 65/08*** | (2009.01) |
| ***A01P 3/00*** | (2006.01) |

(52) U.S. Cl.
CPC ............. *A01N 47/48* (2013.01); *A01N 47/46* (2013.01); *A01N 51/00* (2013.01); *A01N 63/50* (2020.01); *A01N 65/08* (2013.01); *A01P 3/00* (2021.08)

(58) Field of Classification Search
None
See application file for complete search history.

(56) References Cited

U.S. PATENT DOCUMENTS

2015/0037310 A1* 2/2015 Hetherington ......... A01N 51/00 424/94.3
2023/0143490 A1* 5/2023 Garita Alvarado .... A01N 47/46 504/141
2023/0147249 A1* 5/2023 Garita Alvarado ....... A01P 3/00 47/57.7
2023/0157296 A1* 5/2023 Garita Alvarado .... A01N 47/14 514/514
2023/0329237 A1* 10/2023 Garita Alvarado .... A01N 47/14

FOREIGN PATENT DOCUMENTS

| | | |
|---|---|---|
| WO | 2012/083446 A1 | 6/2012 |
| WO | 2015/013808 A1 | 2/2015 |
| WO | 2021/191313 A1 | 9/2021 |
| WO | 2021/191314 A1 | 9/2021 |
| WO | 2021/191315 A1 | 9/2021 |
| WO | 2021/191316 A1 | 9/2021 |
| WO | 2021/191317 A1 | 9/2021 |

OTHER PUBLICATIONS

Yang, Shuang-yu et al., "In vitro toxicity test of soil disinfectants to *Fusarium oxysporum* f. sp. *cubence* and the control effects on banana *Fusarium* wilt," Acta Agriculturae Universitatis Jiangxiensis, vol. 41(2), pp. 249-257 (2019).*

Allyl Isothiocyanate Technical Evaluation Report, USDA National Organic Program, pp. 1-25 (2014).*

Ploetz, R.C., "*Fusarium* wilt of banana," Phytopathology Review, vol. 105(12), pp. 1512-1521 (2015).*

Molina, A.B. et al., "Field resistance of Cavendish somaclonal variants and local banana cultivars to tropical race 4 of *Fusarium* wilt in the Philippines," Acta Horticulturae, pp. 227-230 (Mar. 2016).*

Food and Agriculture Organization of UN, IPPC Global coordination response on *Fusarium oxysporum* f. sp. *cubense* Tropical Race 4 (TR4). Date not avaiable. < https://www.ippc.int/en/core-activities/capacity-development/programmes/ippc-global-coordination-on-fusarium-oxysporum-f-sp-cubense-tropical-race-4-tr4/>.*

Wang, K-H et al. Exploring biological management methods against *Fusarium* wilt of banana in Hawai'i. Hanai'Ai: the Sustainable Agriculture Newsletter of the College of Tropical Agriculture and Human Resources (CTAHR), University of Hawai'i, Nov. 1, 2019 (Nov. 1, 2019), vol. 35. Retrieved from <https://cms.ctahr.hawaii.edu/soap/Hanai-Ai/ArtMID/40474/ArticleID/1363/vol. 35-Aug-%7c-Sept-%7c-Oct-2019>.

Prasad, P and Kumar J. Management of *Fusarium* wilt of chickpea using brassicas as biofumigants. Legume Research, Jan. 31, 2017 (Jan. 31, 2017), vol. 40(1), pp. 178182, ISSN: 0976-0571 (online).

Ren, Get al. Soil bacterial community was changed after *Brassicaceous* seed meal application for suppression of *Fusarium* wilt on pepper. Frontiers in Microbiology, Feb. 13, 2018 (Feb. 13, 2018), vol. 9, Article 185, doi: 10.3389/fmicb.2018.00185, ISSN 1664-302X (online).

* cited by examiner

*Primary Examiner* — John Pak
(74) *Attorney, Agent, or Firm* — Smart & Biggar LP; Micheline Gravelle

(57) ABSTRACT

Provided are methods for controlling *Fusarium* wilt of banana plants. The methods involve applying a glucosinolate, glucosinolate hydrolysate, isothiocyanate or thiocyanate containing composition to the growth medium of a banana plant.

12 Claims, 1 Drawing Sheet

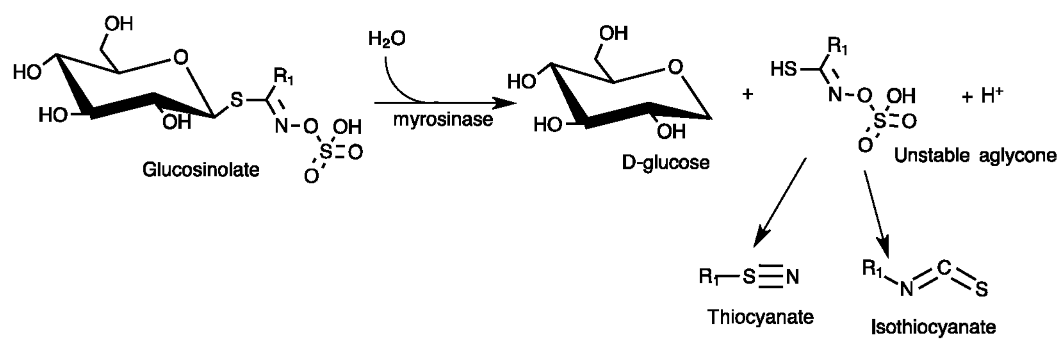
Glucosinolate
myrosinase
D-glucose
+
+ H+
Unstable aglycone
Thiocyanate
Isothiocyanate

METHODS FOR CONTROLLING FUSARIUM WILT OF BANANA PLANTS

CROSS-REFERENCE TO RELATED APPLICATIONS

This application is a National Phase Entry Application of PCT/CA2021/051710 filed Nov. 30, 2021, which claims the benefit of U.S. Provisional Patent Application No. 63/119, 299, filed Nov. 30, 2020; the entire contents of which is hereby incorporated by reference.

FIELD OF THE DISCLOSURE

The present disclosure relates to methods for controlling banana plant diseases. In particular, the present disclosure relates to methods for controlling *Fusarium* wilt of banana plants.

BACKGROUND OF THE DISCLOSURE

The following paragraphs are not an admission that anything discussed in them is prior art or part of the knowledge of persons skilled in the art.

Banana is an economically important food crop, in particular in Asia, Africa, Latin America, and the Caribbean. However, in part as a result of a lack in genetic diversity, the crop is vulnerable to phytotoxic diseases. In this respect, *Fusarium* wilt, also known as "Panama disease", is a lethal fungal disease caused by the soil-borne fungus *Fusarium oxysporum* f. sp. *cubense* (Foc) that represents a significant threat to both commercial cultivation and small-scale subsistence farming. The fungus infects the plant from the soil through the plant's root system and colonizes the plant's xylem vessels, producing gels and gums that block the flow of water and nutrients. As the disease progresses, leaves collapse at the petiole, the pseudo-stem splits, and eventually the banana plant dies. The externally visible symptoms of *Fusarium* wilt disease include yellowing, necrosis, and death of the oldest leaves of the plant.

The pathogenic isolates of Foc can be classified into races, based on the banana cultivars on which they cause disease. Races 1 and 2 are found predominantly in Latin America, while Race 4 generally occurs in the Far East. However, more recently Race 4 has also been identified in Latin America (Science Magazine, 2019 doi:10.1126/science.aay7681).

Panama disease Tropical race 4 is caused by *Fusarium oxysporum* f. sp. *cubense* (Foc) Tropical race 4 (TR4). The widely cultivated Cavendish banana cultivars are particularly susceptible to Foc TR4. The economic damage to the banana cultivation caused by Foc TR4 is significant, and it is estimated that if no solutions are found, Foc TR4 can spread to 1.6 million acres, or 17% or the current area in production by 2040, corresponding with an annual production loss of 36 million tonnes (Food and Agriculture Organization. 2017. The Global Programme on Banana *Fusarium* Wilt Disease).

There is, therefore, a need in the art for methods to control banana plant disease, and, in particular, there is a need to control *Fusarium* wilt of banana plants.

SUMMARY OF THE DISCLOSURE

The following paragraphs are intended to introduce the reader to the more detailed description that follows and not to define or limit the claimed subject matter.

The present disclosure relates to methods for controlling a banana plant disease, notably *Fusarium* wilt. Thus, in an aspect, the present disclosure provides methods to protect a valuable food crop from a lethal phytotoxic disease.

Accordingly, in an aspect, the present disclosure provides, in accordance with the teachings herein, in at least one embodiment, a method for controlling *Fusarium* wilt of a banana plant, the method comprising applying a fungicidally effective amount of a composition comprising glucosinolate, a glucosinolate hydrolysate, isothiocyanate or thiocyanate to the banana plant or growth medium of the banana plant.

In at least one embodiment, in an aspect, the composition can comprise a glucosinolate, glucosinolate hydrolysate, isothiocyanate or thiocyanate containing plant seed extract.

In at least one embodiment, in an aspect, the composition can comprise a glucosinolate, glucosinolate hydrolysate, isothiocyanate or thiocyanate containing plant seed meal.

In at least one embodiment, in an aspect, the composition can comprise a glucosinolate, glucosinolate hydrolysate, isothiocyanate or thiocyanate containing mustard plant extract.

In at least one embodiment, in an aspect, the composition can comprise a substantially pure glucosinolate, a glucosinolate hydrolysate, isothiocyanate or thiocyanate preparation.

In at least one embodiment, in an aspect, the thiocyanate can comprise allyl thiocyanate (ATC).

In at least one embodiment, in an aspect, the isothiocyanate can comprise allyl isothiocyanate (AITC).

In at least one embodiment, in an aspect, the composition can further comprise a carrier, excipient, or diluent.

In at least one embodiment, in an aspect, the composition can further comprise ascorbate or glycerine.

In at least one embodiment, in an aspect, the composition can be formed by mixing a particulate mustard plant seed meal mixture comprising a *Brassica* seed meal comprising glucosinolates and a *Sinapis* seed meal comprising myrosinase with a diluent.

In at least one embodiment, in an aspect, the composition can comprise a particulate mustard plant seed meal mixture comprising a *Brassica* seed meal comprising glucosinolate and a *Sinapis* seed meal comprising myrosinase, wherein the glucosinolate is hydrolyzed by the catalytic activity of the myrosinase in the growth medium to form a glucosinolate hydrolysate comprising thiocyanate or isothiocyanate.

In at least one embodiment, in an aspect, the seed meal mixture can comprise from about 60% (w/w) up to about 99% (w/w) *Brassica juncea* seed meal, and from about 1% (w/w) to about 40% (w/w) *Sinapis alba* seed meal.

In at least one embodiment, in an aspect, the composition can be a liquid composition comprising a *Brassica* glucosinolate hydrolysate comprising isothiocyanate or thiocyanate.

In at least one embodiment, in an aspect, the composition can be a liquid composition comprising a *Brassica* glucosinolate hydrolysate comprising from about 0.4 mg/ml to about 50 mg/ml thiocyanate or isothiocyanate.

In at least one embodiment, the composition can be a liquid composition comprising a *Brassica juncea* glucosinolate hydrolysate comprising isothiocyanate or thiocyanate and a *Sinapis alba* myrosinase complex, the *Brassica* glucosinolate hydrolysate having been formed by hydrolysis of *Brassica* glucosinolate upon catalysis thereof catalyzed by the *Sinapis* myrosinase complex.

In at least one embodiment, in an aspect, the liquid composition can comprise 1 to 10,000 *Sinapis alba* myrosinase activity units per gram of sinigrin.

In at least one embodiment, in an aspect, the composition can be a liquid composition a *Brassica juncea* glucosinolate hydrolysate comprising 1 to 10,000 *Sinapis alba* myrosinase activity units per gram of sinigrin, wherein the composition is applied at a rate of from about 10 to about 800 liters per hectare.

In at least one embodiment, in an aspect, the composition can be a liquid composition comprising a *Brassica juncea* glucosinolate comprising 10 to 1,000 *Sinapis alba* myrosinase activity units per gram of sinigrin, wherein the composition is applied at a rate of from about 10 to about 800 liters per hectare.

In at least one embodiment, in an aspect, the composition can be a solid composition applied at a rate of at least 13 kg per hectare and can be a seed meal mixture comprising from about 60% (w/w) up to about 99% (w/w) *Brassica* seed meal, and from about 1% (w/w) up to about 40% (w/w) *Sinapis alba* seed meal.

In at least one embodiment, in an aspect, the banana plant be a banana plant belonging to the Cavendish cultivar group.

In at least one embodiment, in an aspect, the *Fusarium* wilt can be caused by *Fusarium oxysporum* f. sp. *cubense* (Foc) Tropical race 4 (TR4).

In at least one embodiment, in an aspect, the growth medium can be soil or a tissue culture medium.

In at least one embodiment, in an aspect, the composition can be applied by spraying drenching, or irrigating.

In another aspect, the present disclosure provides, in at least one embodiment, a kit or commercial package for controlling *Fusarium* wilt of a banana plant comprising:

(a) a composition comprising glucosinolate, glucosinolate hydrolysate thiocyanate or isothiocyanate; and
(b) instructions for application of a fungicidally effective amount of the composition to the banana plant or growth medium of the banana plant to thereby control *Fusarium* wilt of a banana plant.

In another aspect, the present disclosure provides, in at least one embodiment, in accordance with the teachings herein, a use of a fungicidally effective amount of a composition comprising glucosinolate, glucosinolate hydrolysate, thiocyanate or isothiocyanate to control *Fusarium* wilt of a banana plant.

Other features and advantages of the present disclosure will become apparent from the following detailed description. It should be understood, however, that the detailed description, while indicating preferred embodiments of the disclosure, are given by way of illustration only, since various changes and modifications within the spirit and scope of the disclosure will become apparent to those of skill in the art from the detailed description.

BRIEF DESCRIPTION OF THE DRAWINGS

The disclosure is in the hereinafter provided paragraphs described, by way of example, in relation to the attached FIGURE. The FIGURE provided herein is provided for a better understanding of the example embodiments and to show more clearly how the various embodiments may be carried into effect. The FIGURE is not intended to limit the present disclosure.

FIG. 1 is a schematic view of chemical reaction depicting the hydrolysis of glucosinolates yielding a glucosinolate hydrolysate comprising thiocyanates and isothiocyanates.

The FIGURE together with the following detailed description make apparent to those skilled in the art how the disclosure may be implemented in practice.

DETAILED DESCRIPTION OF THE DISCLOSURE

Various methods, compositions or systems will be described below to provide an example of an embodiment of each claimed subject matter. No embodiment described below limits any claimed subject matter and any claimed subject matter may cover methods, compositions or systems that differ from those described below. The claimed subject matter is not limited to methods, compositions or systems having all of the features of any one method, composition or system described below, or to features common to multiple or all of the compositions, systems or processes described below. It is possible that a method, composition, or system described below is not an embodiment of any claimed subject matter. Any subject matter disclosed in a method, composition or system described below that is not claimed in this document may be the subject matter of another protective instrument, for example, a continuing patent application, and the applicants, inventors or owners do not intend to abandon, disclaim or dedicate to the public any such subject matter by its disclosure in this document.

As used herein and in the claims, the singular forms, such as "a", "an" and "the" include the plural reference and vice versa unless the context clearly indicates otherwise. Throughout this specification, unless otherwise indicated, "comprise," "comprises" and "comprising" are used inclusively rather than exclusively, so that a stated integer or group of integers may include one or more other non-stated integers or groups of integers.

The term "or" is inclusive unless modified, for example, by "either".

When ranges are used herein, such as for concentrations, for example, all combinations and sub-combinations of ranges and specific implementations therein are intended to be included. Other than in the operating examples, or where otherwise indicated, all numbers expressing quantities of ingredients or reaction conditions used herein should be understood as being modified in all instances by the term "about." The term "about" when referring to a number or a numerical range means that the number or numerical range being referred to is an approximation within experimental variability (or within statistical experimental error), and thus the number or numerical range may vary between 1% and 15% of the stated number or numerical range, as will be readily recognized by context. Furthermore, any range of values described herein is intended to specifically include the limiting values of the range, and any intermediate value or sub-range within the given range, and all such intermediate values and sub-ranges are individually and specifically disclosed (e.g., a range of 1 to 5 includes 1, 1.5, 2, 2.75, 3, 3.90, 4, and 5). Similarly, other terms of degree such as "substantially" and "approximately" as used herein to modify a term is understood to mean a reasonable amount of deviation of the modified term such that the end result is not significantly changed. These terms of degree should be construed as including a deviation of the modified term if this deviation would not negate the meaning of the term it modifies.

Unless otherwise defined, scientific and technical terms used in connection with the formulations described herein shall have the meanings that are commonly understood by those of ordinary skill in the art. The terminology used herein is for the purpose of describing particular implementations only, and is not intended to limit the scope of the present disclosure, which is defined solely by the claims.

All publications, patents and patent applications are herein incorporated by reference in their entirety to the same extent as if each individual publication, patent, or patent application was specifically and individually indicated to be incorporated by reference in its entirety.

Definitions

The term "thiocyanate", as used herein, refers to a class of chemical compounds having the chemical structure:

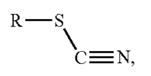

wherein R— is any side group —$R_1$ of a glucosinolate, or wherein R— is an electron pair.

The term "isothiocyanate", as used herein, refers to a class of chemical compounds having the chemical structure:

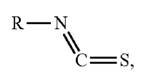

wherein R— is any side group —$R_1$ of a glucosinolate.

The term "glucosinolate" refers to a class of chemical compounds having the chemical structure:

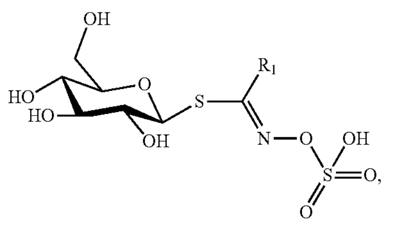

and includes any glucosinolate compound wherein —$R_1$ can be selected from any one of:

(I)

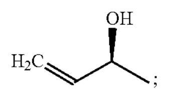

(II)

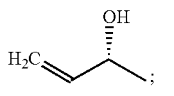

(III)

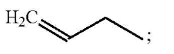

(IV)

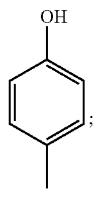

(V)

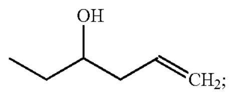

-continued (VI)

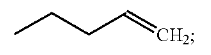

(VII)

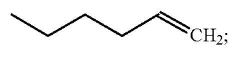

(VIII)

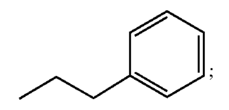

(IX)

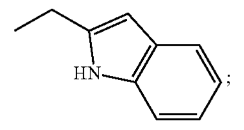

(X)

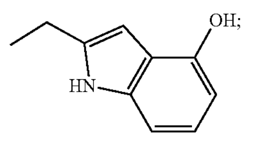

(XI)

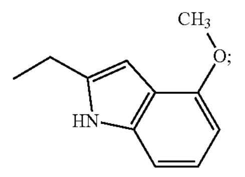

(XII)

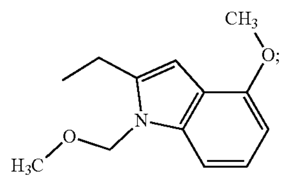

(XIII)

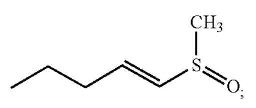

(XIV)

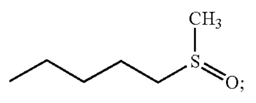

(XV)

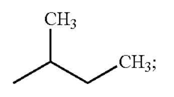

(XVI)

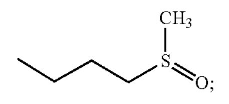

(XVII)

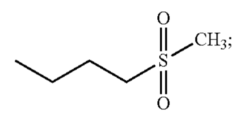

(XVIII)

(XIX)

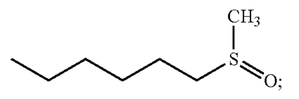

-continued (XX)

(XXI)

(XXII)

(XXIII)

(XXIV)

(XXV)

(XXVI)

or (XXVII)

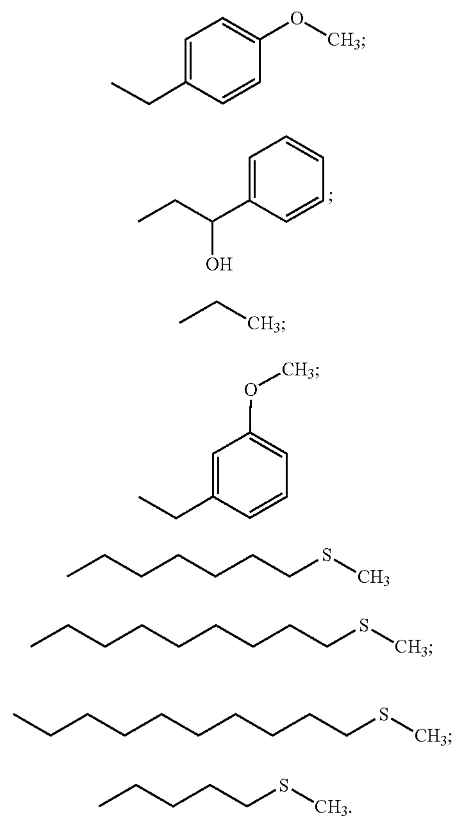

It is noted that the corresponding glucosinolates are also known as: progoitrin (I); epiprogoitrin (II); sinigrin (III); sinalbin (IV); gluconapolieferin (V); gluconapin (VI); glucobrassicanapin (VII); gluconasturtiin (VIII); glucobrassicin (IX); 4-hydroxyglucobrassicin (X); 4-methoxy-glucobrassicin (XI); neoglucobrassicin (XII); glucoraphenin (XIII); glucoraphanin (XIV); glucochlearin (XV); glucoiberverin (XVI); glucocheirolin (XVII); glucoapparin (XVIII); glucoalyssin (XIX); glucoaubrietin (XX); glucobarbarin (XXI); glucolepidin (XXII); glucolimnantin (XXIII); glucolesquerlin (XXIV); glucojirsutin (XXV); glucoarabin (XXVI); and glucoerucin (XXVII), respectively.

The terms "allyl thiocyanate", or "ATC", as may be used interchangeably herein, refer to the chemical compound having the chemical structure:

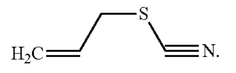

The term "allyl isothiocyanate" or "AITC", as may be used interchangeably herein, refer to the chemical compound having the chemical structure:

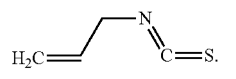

The terms "banana" and "banana plant" refer to any plant belonging to the genus *Musa*, including the species *Musa acuminata* and *Musa balbisiana*, and include all subspecies, cultivar groups, including, without limitation, the Cavendish group, cultivars, varieties, hybrids, or genotypes thereof.

The expression "fungicidally effective amount", as used herein, refers to any amount that results in the prevention or retardation of fungal proliferation for a limited or prolonged period of time, and further includes any amount that is lethal to a fungus.

The phrase "controlling *Fusarium* wilt of a banana plant", as used herein, means that *Fusarium* wilt in a banana plant is prevented or treated to reduce disease severity, incidence or symptoms and includes preventing proliferation of *Fusarium* wilt, retarding proliferation of *Fusarium* wilt, or killing or eradicating of *Fusarium* wilt in a banana plant or in the growth substrate of a banana plant.

The term "substantially pure", as used herein, in relation to a chemical substance refers to a preparation of such substance in which the substance has been separated from components that naturally accompany it. Typically, a chemical substance is substantially pure when at least 60%, more preferably, at least 75%, at least 80%, at least 90%, at least 95%, at least 96%, at least 97%, at least 98%, or at least 99% (by volume, by wet or dry weight, or by mole percent or fraction) in a sample is the compound of interest. Purity can be measured by any appropriate technique, e.g., gas chromatography (GC), or high-performance liquid chromatography (HPLC).

General Implementation

As hereinbefore mentioned, the present disclosure relates to methods and compositions for controlling *Fusarium* wilt of banana plants.

In accordance herewith, in one aspect, the present disclosure provides, in at least one embodiment, a method for controlling *Fusarium* wilt of a banana plant, the method comprising applying a composition comprising glucosinolate, a glucosinolate hydrolysate, isothiocyanate or thiocyanate to the banana plant or growth medium of the banana plant.

Accordingly, initially a composition comprising glucosinolate, a glucosinolate hydrolysate, isothiocyanate or thiocyanate is prepared, obtained, or provided.

A glucosinolate, glucosinolate hydrolysate, isothiocyanate or thiocyanate containing composition can be prepared by obtaining glucosinolate, a glucosinolate hydrolysate, isothiocyanate, or thiocyanate from natural sources, or by chemical synthesis thereof. Thus, for example, glucosinolate can be isolated from natural sources, such as mustard plants. Furthermore, isothiocyanate or thiocyanate can be prepared by obtaining a glucosinolate preparation, and hydrolyzing the glucosinolate constituents therein to obtain a glucosinolate hydrolysate comprising thiocyanate compounds and/or isothiocyanate compounds. The pertinent glucosinolate hydrolysis reaction can be represented as shown in FIG. 1. It is noted that the hydrolysis reaction can be catalyzed by an enzyme known as myrosinase.

Thus, a glucosinolate preparation, a glucosinolate hydrolysate, a thiocyanate preparation, or an isothiocyanate preparation, can be obtained by isolation thereof from natural sources comprising glucosinolate compounds. Particularly useful in this respect, are plants comprising glucosinolates. Such plants include plants belonging to the plant families of Brassicaceae (Cruciferae), Akianaceae, Bataceae, Bretschneideraceae, Capparaceae, Caricaceae, Drypetes (Euphorbiaceae), Gyrostemonaceae, Limnanthaceae, Moringaceae, Pentadiplantdraceae, Resedaceae, Salvadoraceae, Tovariaceae and Tropeaolaceae. The plants in accordance herewith may readily be obtained by growing or culturing such plants using conventional agricultural practices. In some embodiments, the glucosinolate preparation, the glucosinolate hydrolysate, thiocyanate e preparation, or isothiocyanate preparation can be obtained from a mustard plant. The term "mustard" and "mustard family" as used herein denotes any plant belonging to the family of Brassicaceae, including any plant belonging to the genera *Brassica, Sinapis* and *Erysimum*. Mustard plants that may be used in accordance with the present disclosure include, but are not limited to, *Brassica napus* (rapeseed), *Brassica juncea* (Oriental, Indian or brown mustard), *Brassica carinata* (Abyssinian or Ethiopian mustard), *Brassica nigra* (black mustard), *Brassica rapa* (rapeseed), *Sinapis alba* (yellow or white mustard), *Sinapis arvensis* (wild mustard), *Erysimum corinthium* and any cultivars or variant of the foregoing, including the Canola cultivar of *Brassica napus*. In accordance herewith, mixtures of any of the hereinbefore mentioned plants or plant materials obtained from such plants may also be used.

In an aspect, a glucosinolate preparation, a glucosinolate hydrolysate, a thiocyanate preparation or an isothiocyanate preparation may be obtained by initially comminuting plants, plant parts, plant portions or plant material containing glucosinolates, or mixtures thereof, which may optionally be prepared or cleaned, for example, dried to remove moisture, or washed to remove extraneous materials, such as soil materials, or certain plant components, such as seed husks or hulls. Plant parts, plant portions and plant material that may be used as a source material include, but are not limited to, plant seeds, stems, roots, or leaves obtainable from or obtained from plants of one of the hereinbefore mentioned plant species. Comminution of plant material may be achieved using comminution equipment, for example, a grinder, blender, or mill or another device capable of substantially fragmenting the plant material. Operating conditions are generally selected such that plant tissue is fragmented to a degree to which plant cell walls lose integrity and rupture.

In one embodiment, seed fractions, such as a seed meal, including a de-oiled seed meal, for example, can be used as the source material from which a glucosinolate preparation may be prepared. Such a de-oiled meal may be commercially purchased, or prepared by subjecting plant seeds to solvent extraction, hydraulic pressing, expeller pressing, cold pressing, or a combination thereof, or other oil removal techniques, which will be known to those of skill in the art, in order to obtain a de-oiled or defatted plant meal. The thus obtained seed fraction can then be used as a starting material to prepare a glucosinolate preparation.

Comminution of plant material is preferably performed in the presence of water or another aqueous extractant, including an aqueous buffer, or a lower alcohol, for example, a $C_1$-$C_4$ alcohol, or a lower ketone, for example a $C_3$-$C_4$ ketone, or mixtures thereof. Glucosinolates will readily dissolve in such aqueous extractants. The ratio of plant material to extractant can be selected to be less than about 1:100 (w/v), more preferably, less than or less than about 1:10 (w/v), and most preferably, less than or less than about 1:1 (w/v). Comminution can be performed at temperatures between 4° C. or about 4° C. and 50° C. or about 50° C., and preferably between 18° C. or about 18° C., and 25° C. or about 25° C. In other embodiments, comminution is performed in the absence of an extractant, and the extractant is mixed with the comminuted plant material. Subsequently, the solid comminuted plant material, including fibrous plant material non-soluble proteins and other non-soluble plant constituents, can be separated from the liquid fraction. Such separation may be achieved using separation equipment, including but not limited to decantation equipment, centrifugation equipment, or filtration equipment or other equipment suitable for the separation of the liquid fraction from the solid plant material. The thus obtained liquid fraction is a glucosinolate preparation that may be used in accordance herewith.

In some embodiments, upon having obtained the liquid fraction, the extraction/separation step may be repeated one or more times, in order to achieve further removal of further solid plant material. In addition, the solid plant material may be extracted two or more times, in order to improve the yield. Centrifugation may additionally be used to separate plant oils, in embodiments where the comminuted plant material comprises plant oils, such as plant seed oils, from the aqueous fraction.

In some embodiments, the glucosinolates present in the liquid fraction may be concentrated and separated from other plant constituents present in the liquid fraction, using, for example, evaporation of the extractant and filtration, through, for example, one or more ion-exchange filtration steps, or through nano-filtration, to obtain a more purified concentrate, for example, a substantially pure glucosinolate preparation, or, as hereinafter described, a substantially pure hydrolyzed glucosinolate preparation can be obtained.

Referring again to FIG. 1, the enzyme myrosinase can catalyze the conversion of glucosinolates to obtain a glucosinolate hydrolysate comprising glucose, unstable aglycone, and thiocyanate compounds and/or isothiocyanate compounds. In general, plants containing glucosinolates also contain myrosinase. However, glucosinolates are generally stable in vivo in plant cells, since myrosinase is stored in a different intracellular compartment, or in different plant cells. The hydrolysis reaction can be initiated during the comminution step when cell walls are broken and glucosinolates and myrosinase come into contact with one another. Thus, the glucosinolate hydrolysate, thiocyanate compounds and/or isothiocyanate compounds can be formed during the comminution and extraction process.

It is noted that the degree to which the hydrolysis reaction proceeds can be controlled by controlling the temperature at which the comminution and extraction/separation steps are conducted. Thus, for example, by conducting these steps, at for example, about 4° C., the obtained glucosinolate preparation may contain predominantly intact glucosinolates. The thus obtained glucosinolate concentrate may be freeze-dried, or spray dried in order to obtain a substantially dry glucosinolate concentrate, or the preparation may be stored in liquid form at, for example, about 4° C. Concentrations of glucosinolate in the preparation may vary from about 5% to about 100%, preferably 5%-80%, and most preferably 5%-50%. At a later stage, the preparation may be obtained and the hydrolysis reaction may be conducted by ensuring sufficient quantities of water or an aqueous buffer are present and the temperature of the preparation is brought up to, for example, from about 18° C. to about 40° C.

In other embodiments, the plant material prior to or during comminution may be heated to temperatures in excess of about 60° C., about 70° C., or about 80° C. At these temperatures, the myrosinase activity is substantially irreversibly lost. Thus a glucosinolate preparation substantially free of hydrolysis products may be obtained. In such embodiment it will be necessary to subsequently exogenously add myrosinase to obtain a hydrolyzed glucosinolate preparation. Myrosinase preparations may be obtained as described, for example, by Wade et al., 2015, Phytochem Anal. 26(1): 47-53, or Bellostas et al., 2008, J. Biochem. Biophys Methods 70 (6): 918-925, or commercially purchased from e.g., Sigma-Aldrich®, and used to contact with a glucosinolate preparation to thereby hydrolyze the glucosinolate constituents in the preparation.

In embodiments hereof in which the plant material is comminuted, extracted, separated, and, optionally, further extracted, at temperatures from about 18° C. to about 40° C., and preferably from about 18° C. to about 25° C., and the plant material is not exposed to temperatures above about 40° C., the glucosinolate constituents in the glucosinolate preparation will undergo hydrolysis during these steps, and a glucosinolate hydrolysate comprising thiocyanate compounds and/or isothiocyanate compounds is obtained.

In the obtained glucosinolate hydrolysate, at least about 50%, about 60%, about 70%, about 80%, about 90%, about 95%, or about 99% of the glucosinolate constituents is hydrolyzed. The obtained glucosinolate hydrolysate can comprise from about 1 mg/ml to about 50 mg/ml thiocyanate or isothiocyanate. The thiocyanate compounds that may be present in a glucosinolate hydrolysate in accordance with the present disclosure include allyl isothiocyanate (AITC) and allyl thiocyanate (ATC). It is noted, that the glucosinolate hydrolysate, in addition to one or more isothiocyanate and/or thiocyanate compounds, may contain other constituents, including additional hydrolysis products, such as glucose, aglycones, and breakdown products of aglycones, such as nitriles, oxazolidine-2-thiones, and epithionitriles, for example. Thus, in some embodiments, the isothiocyanate preparation or the thiocyanate preparation of the present disclosure can be a mixture comprising two or more isothiocyanate compounds, or two or more thiocyanate compounds, respectively, or the isothiocyanate preparation or the thiocyanate preparation of the present disclosure can be a mixture comprising two or more compounds selected from the following: a thiocyanate compound; an isothiocyanate compound; glucose; aglycone; and an aglycone breakdown product other than an isothiocyanate or a thiocyanate.

In some embodiments, the glucosinolate hydrolysate may be used to extract isothiocyanate or thiocyanate compounds to obtain a more or less pure isothiocyanate or thiocyanate preparation from which myrosinase, non-isothiocyanate or thiocyanate hydrolysis products, such as glucose, and aglycone products have been removed to obtain a substantially pure isothiocyanate or thiocyanate preparation. Such more or less pure preparations may be obtained using, for example, chromatographic techniques.

Furthermore, in some embodiments, thiocyanate or isothiocyanate may be synthesized chemically and/or commercially purchased from a fine chemical manufacturer e.g., Sigma-Aldrich® (St. Louis, MI, USA).

Analytical techniques to quantify glucosinolates, glucosinolate hydrolysis, and glucosinolate hydrolysis products are known to the art and include, for example, enzymatic assays in which a glucosinolate preparation is subjected to hydrolysis using (commercially obtained) myrosinase. The formed glucose can in turn be converted by hexokinase and glucose-6-phosphate dehydrogenase, which results in the production on nicotine adenine dinucleotide phosphate (NADPH), which be detected spectrophotometrically at 340 nm or 520 nm. Furthermore, gas-chromatography techniques and high-performance liquid chromatography techniques may also be used to quantify glucosinolates, glucosinolate hydrolysis and glucosinolate hydrolysis products, as further described, for example, in the European Food Safety Authority Journal, 2008, 590: 1-76.

As hereinbefore noted, in one embodiment, the glucosinolate preparation, the glucosinolate hydrolysate, the isothiocyanate preparation, or thiocyanate preparation may be obtained from a seed meal. In one example embodiment, the seed meal is a mustard seed meal. In accordance with this embodiment, any process yielding a mustard seed meal comprising glucosinolates may be used. Mustard seed can be purchased commercially or may readily obtained through conventional agricultural production of mustard plants. The mustard seed is preferably cleaned, in order to remove non-mustard plant material, and dried prior to further processing. In order to clean the mustard seed, the seed may be subjected to an elementary separation procedure, for example, by contacting the mustard seed with a separation means such as vibrating screen or a grain cleaning machine, for example, but not limited to, a grain cleaning machine such as manufactured by Damas A/S (Denmark). Through such operation the mustard seed may be separated from non-mustard seed material, such as rocks, sticks, dirt, leaves, weed seeds, loose hulls etc. Mustard seed may optionally be dried, using for example, equipment used for grain drying, such as a grain dryer, for example a grain dryer as manufactured by Vertec Industries Limited (Canada). The grain drying equipment may be operated so that the moisture content of the seed is reduced to, for example, between 5% or about 5% and 7% or about 7%. Dried mustard seed may be stored or mixed with other mustard seed. In order to prepare mustard seed meal, the outer seed coating, also known as the seed husk or bran, is optionally removed from the seed by milling or cracking the seed or using another suitable abrasive process to obtain the seed kernel. The oil or fat content in the seed meal that is prepared may vary. Full fat meals and defatted meals may both be used in accordance with the present disclosure. If a full fat meal is desired then the mustard seed, or optionally the seed kernels, are subjected to a process that does not result in oil extraction. If a defatted meal is desired then the seed, or optionally the seed kernels, are subjected to a process resulting in oil removal. In preferred embodiments of the present disclosure, a defatted meal is prepared. Accordingly, the mustard seed or seed kernels can be ground using grinding equipment, for example, a hammer mill, to obtain mustard flour. The seed oil may be removed from the flour, for example, by organic solvent extraction, using for example, hexane, or by mechanical separation from the non-oil components of the seed. Mechanical separation may be achieved using, for example, an oil expeller or press, such as an oil press such as a Täby Press manufactured by Skeppsta Maskin AB (Sweden) or a Komet oil expeller manufactured by Monforts Oekotec GmbH (Germany). A combination of mechanical oil removal followed by organic solvent extraction can also be used to achieve further removal of oil from the mustard seed. Preferably, the mustard seed meal used in accordance with the present disclosure comprises between at least 2% or about 2% and no more than 50% or about 50% of the total seed oil content, and more preferably approximately between 10% or about 10%, and 15% or about 15%, and most preferably 15% or about 15% of the total seed oil content. The seed meal obtained comprises active myrosinase complex in a concentration sufficient to release an effective amount of glucosinolate breakdown products upon the addition of water. The amount of water present in the final myrosinase preparation may vary from 1-99%, e.g., between 60-90%, 70-90% or 80-90%. In preferred embodiments of the present disclosure, the mustard seed meal comprising active myrosinase complex has a moisture content of less than 12% or about 12%. Spray dried preparations may also be obtained and comprise from about 0.5% to 5%, or from about 1% to about 3% water. Many processes for processing raw mustard seed into oil and meal known to the art. Further processes that may be used are the processes disclosed in Morra, M. J, 2000-2002, Subcontract Report National Renewable Energy Laboratory NREL/SR-510-3628, which is incorporated herein in its entirety by reference.

Thus, to briefly recap, a more or less pure glucosinolate preparation, glucosinolate hydrolysate, thiocyanate preparation, or isothiocyanate preparation may be prepared from natural source materials, notably plant materials naturally containing glucosinolate compounds. A glucosinolate preparation may be obtained and subjected to conditions permitting hydrolysis of the glucosinolate constituents of the preparation to thereby obtain a glucosinolate hydrolysate. The glucosinolate hydrolysate may be used as an isothiocyanate and/or thiocyanate preparation, or it may be used to extract isothiocyanate and/or thiocyanate. Furthermore, the foregoing preparations are glucosinolate, glucosinolate hydrolysate, isothiocyanate or thiocyanate containing compositions and as such are suitable for use in accordance with the present disclosure.

In some embodiments, the glucosinolate preparation, the glucosinolate hydrolysate, thiocyanate preparation, or isothiocyanate preparation may be further formulated by contacting the glucosinolate preparation, the glucosinolate hydrolysate, thiocyanate preparation, or isothiocyanate preparation with other ingredients in a suitable mixing vessel with agitation, such as a mechanical blender or mixer, or other suitable device producing sufficient circulation or agitation to thoroughly mix the ingredients. Mixing conditions, such as time and temperature, can be adjusted, but are generally selected to dissolve or suspend the glucosinolate, the glucosinolate hydrolysate, thiocyanate or isothiocyanate preparation and obtain a homogenous liquid formulation. In general, mixing can be performed at ambient conditions.

Other ingredients that may be included in the composition comprising glucosinolate, a glucosinolate hydrolysate, thiocyanate or isothiocyanate composition include at least one of a diluent, carrier, or excipient. Suitable diluents include water, a buffer, an alcohol, water soluble polyols (e.g., glycol, glycerine, glycerol, diglycerin, triglycerin, polyglycerin), or a vegetable oil. Suitable excipients that may be included in the liquid formulation include surface active agents, pH-modifying agents (acids, bases, buffers), salts, anti-foaming agents, humidifying agents, penetrating agents, adherence agents, wetting agents, odorants, viscosity modifiers, co-fungicide, pesticides (including, for example, insecticides or herbicides for example), pigments, antifreeze agents, preservatives, enzymatic enhancers, such as ascorbic acid, for example, and process aids. Suitable carriers that that may be included in the liquid formulation include solid carriers such as, silicas, diatomaceous earth, chalk, or clay. The order of addition of the ingredients to the glucosinolate, glucosinolate hydrolysate, thiocyanate or isothiocyanate preparation may be varied and is generally not critical, however, it may be beneficial to initially mix the glucosinolate preparation, glucosinolate hydrolysate, thiocyanate or isothiocyanate preparation with a diluent, and thereafter add the other ingredients.

It is noted that in embodiments hereof where a less pure glucosinolate preparation is used the non-glucosinolate constituents in the preparation may impart some of the properties of the above noted ingredients. Thus, for example, certain endogenous sugars may be retained in a glucosinolate preparation, and may facilitate adherence of the formulation to the plant foliar tissue.

In some embodiments, the composition is a dry particulate formulation, for example, a dry glucosinolate particulate. The glucosinolate particulate can be applied to a growth medium and hydrolyzed in the presence of moisture present in the growth medium to thereby form a glucosinolate hydrolysate containing thiocyanate or isothiocyanate. Thus, in one example, the seed meal mixture can comprise from about 60% (w/w) up to about 99% (w/w) *Brassica juncea* seed meal, and from about 1% (w/w) to about 40% (w/w) *Sinapis alba* seed meal can be formed and used.

In some embodiments, the composition is a liquid formulation, for example, a seed meal composition mixed with a diluent, for example water. Thus, for example, in one embodiment, the thiocyanate or isothiocyanate containing composition can a be a liquid composition comprising a *Brassica* glucosinolate hydrolysate. In a further embodiment, the composition can be a liquid formulation comprising a *Brassica* seed meal and *Sinapis* seed meal together with a diluent. In one example embodiment, the seed meal mixture can comprise from about 60% (w/w) up to about 99% (w/w) *Brassica juncea* seed meal, and from about 1% (w/w) to about 40% (w/w) *Sinapis alba* seed meal, together with a diluent. In some embodiments, the seed meal mixture can comprise about 60% (w/w) *Brassica juncea* seed meal, and about 40% (w/w) *Sinapis alba* seed meal, together with a diluent. In some embodiments, the seed meal mixture can comprise about 70% (w/w) *Brassica juncea* seed meal, and about 30% (w/w) *Sinapis alba* seed meal, together with a diluent. In some embodiments, the seed meal mixture can comprise about 80% (w/w) *Brassica juncea* seed meal, and about 20% (w/w) *Sinapis alba* seed meal, together with a diluent. In some embodiments, the seed meal mixture can comprise about 90% (w/w) *Brassica juncea* seed meal, and about 10% (w/w) *Sinapis alba* seed meal, together with a diluent. In some embodiments, the seed meal mixture can comprise about 95% (w/w) *Brassica juncea* seed meal, and 5% (w/w) *Sinapis alba* seed meal, together with a diluent. In some embodiments, the seed meal mixture can comprise about 99% (w/w) *Brassica juncea* seed meal, and 1% (w/w) *Sinapis alba* seed meal, together with a diluent.

In a further example embodiment, the thiocyanate or isothiocyanate containing composition can a be a liquid composition comprising a *Brassica juncea* glucosinolate hydrolysate and a *Sinapis alba* myrosinase complex, the *Brassica* glucosinolate hydrolysate having been formed by hydrolysis of *Brassica juncea* glucosinolate upon catalysis thereof catalyzed by the *Sinapis alba* myrosinase complex.

In accordance herewith, the composition is generally prepared to include therein a fungicidally effective amount of a glucosinolate preparation, a glucosinolate hydrolysate, a thiocyanate, or an isocyanate preparation. In this respect, a suitable liquid composition can be prepared by including therein an amount of the thiocyanate or isocyanate preparation so that the final concentration of thiocyanate or isothiocyanate in the composition is at least about 0.1 mg/ml, 0.2 mg ml, 0.3 mg/ml, or 0.4 mg/ml thiocyanate or isothiocyanate, and, furthermore, concentrations may range, for example, from about 1 mg/ml thiocyanate or isothiocyanate to about 100 mg/ml thiocyanate or isothiocyanate or from about 1 mg/ml thiocyanate or isothiocyanate to about 100 mg/ml, including, for example, 1 mg/ml, 2.5 mg/ml, 5 mg/ml, 10 mg/ml, 15 mg/ml, 20 mg/ml, 25 mg/ml, 30 mg/ml, 35 mg/ml, 40 mg/ml, 45 mg/ml or 50 mg/ml. Where solid compositions are prepared, sufficient quantities are included therein so that the concentration of thiocyanate or isothiocyanate upon application to a substrate is comparable to the concentration attained when a liquid composition is applied. It will be understood that in cases where a glucosinolate preparation is applied, a glucosinolate preparation would include an amount which upon hydrolysis generates fungicidally effective amounts of thiocyanate or isothiocyanate, for example, the foregoing concentrations of thiocyanate or isocyanate.

As is well understood by those of skill in the art, the exact amount necessary to formulate a fungicidally effective formulation may vary, for example depending on the stage of development of the banana plant and general condition of the subject banana plant to be treated, the severity of the infection being treated, the particular preparation delivered, the site of administration, the mode of administration, as well as other factors. An appropriate fungicidally effective amount can be readily determined by one of skill in the art. Thus, a fungicidally effective amount will be an amount sufficient to bring about control of the *Fusarium* wilt, and will fall in a relatively broad range that can be determined through routine trials.

In accordance herewith, in an aspect, in one example embodiment, a glucosinolate containing composition may be applied to a banana plant, or portion thereof, or to the growth medium of a banana plant to control *Fusarium* wilt.

Thus, in accordance herewith, in an aspect, in one example embodiment, a glucosinolate hydrolysate containing composition may be applied to a banana plant, or portion thereof, or to the growth medium of a banana plant to control *Fusarium* wilt.

Thus, in accordance herewith, in an aspect, in one example embodiment, a thiocyanate containing composition may be applied to a banana plant, or portion thereof, or to the growth medium of a banana plant to control *Fusarium* wilt.

Thus, in accordance herewith, in an aspect, in one example embodiment, an isothiocyanate containing composition may be applied to a banana plant, or portion thereof, or to the growth medium of a banana plant to control *Fusarium* wilt.

Thus, in an aspect, in accordance herewith, the compositions can be applied to a banana plant, or portion thereof, or to the growth medium of a banana plant to control *Fusarium* wilt. Thus, the compositions can be applied to for example the foliage, stem, or roots through the soil. The growth medium can be any soil or artificial growth medium, such as tissue culture growth medium, in which a banana plant is grown, and the compositions are generally applied in the proximity of the banana plant so that the compositions are distributed in the growth medium surrounding the banana plant's root system.

In accordance herewith the banana plant can be any banana plant, including, for example, a banana plant belonging to the Cavendish cultivar group, including, for example, Nanica, Nañicao, and Grand Nain. The banana plant may be grown in the laboratory, a nursery, a greenhouse, or outdoor, and at any scale, including for commercial agricultural purposes, subsistence farming, or for home and garden use. Furthermore, the compositions may be applied at any developmental stage in the or life cycle of a banana plant, including in tissue culture stage, plantlet stage, vegetative growth stage, flowering stage, fruiting stage etc., as well as prior to growth of a banana plant in a growth medium, in order to prepare the growth medium for growth of a banana plant therein.

In accordance herewith, the compositions can be applied to prevent *Fusarium* wilt, or the composition can be applied to treat *Fusarium* wilt, for example, after a banana plant has been infected with *Fusarium* and when disease symptoms have appeared. The *Fusarium* can include race 4 *Fusarium*, including *Fusarium oxysporum* f. sp. *cubense* (Foc) Tropical race 4 (TR4).

In accordance herewith, any application technique or methodology may be used, including any spraying (for example, targeted spraying, broadcast spraying) drenching, or irrigating technique. Soil applicators that may be used include, for example, a gravity flow applicator, including chisel, tooth, or shank type applicators. Commercially available sprayers, aerators, atomizers, low pipes, pulverizers, and blowguns may also be used. Irrigating devices that may be used for application of the present compositions include drip emitters microsprayers, emitter tubing, mistors, and the like.

The application rate may vary. The degree of control may be varied as desired. Thus, for example, *Fusarium* proliferation may be retarded, or the *Fusarium* may be killed or eradicated from the growth medium and/or the banana plant. Furthermore, the treatment frequency may be varied, for example, daily, every 3, 4 or 5 days, or the composition may be applied once a week, once a month, or once a year.

In one embodiment, the composition can be applied at a rate of at least 13 kg per hectare and can be a seed meal mixture comprising from about 60% (w/w) up to about 99% (w/w) *Brassica juncea* seed meal, and from about 1% (w/w) to about 40% (w/w) *Sinapis alba* seed meal.

In one embodiment, the composition can be a liquid composition applied at a rate of from 10 liters, or about 10 liters per hectare to 800 liters or about 800 liters per hectare, for example, at a rate of about 25 l/ha, about 50 I/ha, about 75 l/ha, about 100 l/ha, about 125 l/ha, about 150 l/ha, about 175 l/ha, about 200 l/ha, about 250 l/ha, about 300 l/ha, about 350 l/ha, about 400 l/ha, about 450 l/ha, about 500 l/ha, about 550 l/ha, about 600 l/ha, about 650 l/ha, about 700 l/ha, about 750 l/ha, or about 800 l/ha, the liquid composition comprising a glucosinolate hydrolysate, for example, a *Brassica juncea* glucosinolate hydrolysate, prepared by including in the liquid composition a glucosinolate preparation at a final concentration of at least about 0.001 mg/ml, for example, about 0.001 mg/ml, about 0.005 mg/ml, about 0.01 mg/ml, about 0.02 mg/ml, about 0.05 mg/ml, about 0.0625 mg/ml, about 0.075 mg/ml, about 0.1 mg/ml, about 0.2 mg/ml, about 0.3 mg/ml, about 0.4 mg/ml or about 0.5 mg/ml sinigrin, and a myrosinase complex, for example, a *Sinapis alba* myrosinase complex, having a final concentration of at least about 10 myrosinase activity units/ml, 25 myrosinase activity units/ml, 50 myrosinase activity units/ml, about 100 myrosinase activity units/ml, about 200 myrosinase activity units/ml, about 250 myrosinase activity units/ml, about 300 myrosinase activity units/ml, about 350 myrosinase activity units/ml, about 400 myrosinase activity units/ml, about 500 myrosinase activity units/ml, about 600 myrosinase activity units/ml, or 650 myrosinase activity units/ml. As will be understood by those of skill in the art, an enzyme unit is a unit referring to the enzyme's catalytic activity. In particular, one enzyme unit is an amount of enzyme that catalyzes the conversion of one micromole of substrate per minute. Thus, 1 myrosinase activity unit is an amount of myrosinase that catalyzes the conversion of 1 micromole of glucosinolate (e.g., sinigrin) per minute, 10 myrosinase activity units is an amount of myrosinase that catalyzes the conversion of 10 micromoles of glucosinolate (e.g., sinigrin) per minute, etc. . . .

Furthermore, in an aspect, a liquid composition may be prepared by selecting a ratio of myrosinase to glucosinolate. In this respect, particularly suitable ratios that may be selected for *Brassica juncea* glucosinolate to *Sinapis alba* myrosinase range from 1 to 10,000 myrosinase activity units per gram of sinigrin, including from about 10 myrosinase activity units to about 1,000 myrosinase activity units per gram or sinigrin, or about 50 myrosinase activity units to about 1,000 myrosinase activity units per gram or sinigrin, or about 50 myrosinase activity units to about 500 myrosinase activity units per gram or sinigrin, including e.g., about 10, 50, 100, 125, 150, 200, 250, 300, 350, 400, 450, 500, 550, 600, 650, 700, 750, 800, 850, 900, 950 or 1,000 myrosinase activity units per gram of sinigrin. Liquid compositions thus formulated may be applied in accordance herewith at a rate of, for example, from 10 liters, or about 10 liters per hectare to 800 liters or about 800 liters per hectare, for example, at a rate of about 25 l/ha, about 50 l/ha, about 75 l/ha, about 100 l/ha, about 125 l/ha, about 150 l/ha, about 175 l/ha, about 200 l/ha, about 250 l/ha, about 300 l/ha, about 350 l/ha, about 400 l/ha, about 450 l/ha, about 500 l/ha, about 550 l/ha, about 600 l/ha, about 650 l/ha, about 700 l/ha, about 750 l/ha, or about 800 l/ha.

As is well understood by those of skill in the art, both the exact ratio of myrosinase to glucosinolate of the composition and the exact amount of the composition applied may vary, for example depending on the stage of development of the banana plant and general condition of the subject banana plant to be treated, the severity of the infection being treated, the particular preparation delivered, the site of administration, the mode of administration, as well as other factors. An appropriate ratio of myrosinase to glucosinolate of the composition and the composition application rate can be readily determined by one of skill in the art. Thus, the application of a fungicidally effective amount of the composition will be an amount sufficient to bring about control of the *Fusarium* wilt, and will fall in a relatively broad range that can be determined through routine trials.

In another aspect, the present disclosure provides, in an embodiment, kits and commercial packages for controlling *Fusarium* wilt of a banana plant. Thus the present disclosure further provides, in an embodiment, a kit or commercial package for controlling *Fusarium* wilt of a banana plant comprising:

(a) a composition comprising glucosinolate, a glucosinolate hydrolysate, thiocyanate or isothiocyanate; and
(b) instructions for application to the banana plant or growth medium of the banana plant to thereby control *Fusarium* wilt of a banana plant.

The instructions may be included with the kit or commercial package (e.g., printed on paper and provided directly with the kit), and/or a reference may be provided for on-line access to the instructions, all of which are intended to be included herein. The instructions may additionally comprise further information regarding the products and its use, e.g., safety information.

In another aspect, the present disclosure provides, in an embodiment, in accordance with the teachings herein, a use of a composition comprising glucosinolate, glucosinolate hydrolysate, thiocyanate or isothiocyanate to control *Fusarium* wilt of a banana plant.

Thus it will now be clear that the methods of the present disclosure permit the control of *Fusarium* wilt of banana plants, and thus provide a means to prevent or limit disease to banana plants.

Hereinafter are provided examples of specific implementations for performing the methods of the present disclosure, as well as implementations representing the compositions of the present disclosure. The examples are provided for illustrative purposes only, and are not intended to limit the scope of the present disclosure in any way.

EXAMPLES

Example 1—Method of Making a Glucosinolate Preparation and a Glucosinolate Hydrolysate Whole seed *Brassica juncea* (*B. juncea*) was deoiled to less than 20% residual oil in meal by expelling and solvent extraction. The de-oiled meal was then extracted using water and the liquid phase was separated from the residue solids using solids/liquid separation. The soluble fraction was concentrated by evaporation or drying or a combination of processes to produce a particulate *B. juncea* meal product comprising glucosinolates, notably sinigrin.

Whole seed *Sinapis* (*S. alba*) was deoiled to less than 20% residual oil in meal by expelling, solvent extraction of a combination of expelling and solvent extraction. The de-oiled *S. alba* meal may be used directly in the final application. Optionally, the *S. alba* meal can further be processed by extraction using water followed by separation of the liquid phase from the residue solids using a typical solids/liquid separation technique, and final concentration of the liquid phase by evaporation or drying. The thus prepared *S. alba* products contain myrosinase.

The *B. juncea* and *S. alba* products may be combined as described, for example, in Example 2 and 3, to effect hydrolysis of the *B. juncea* glucosinolates by the *Sinapis alba* myrosinase and obtain a glucosinolate hydrolysate. The relative amounts of *B. juncea* and *S. alba* product may vary, and may, for example, be selected to obtain a hydrolysate comprising a particular ratio of myrosinase activity units per unit weight of glucosinolate. Thus, for example, a hydrolysate having 10 myrosinase activity units per gram of sinigrin, or 50 or myrosinase activity units per gram of sinigrin, or 100 myrosinase activity units per gram of sinigrin, may be prepared.

Example 2—Fungicidal Efficacy of a Particulate Mustard Plant Material Against *Fusarium*

A *Brassica juncea* meal product and *Sinapis alba* meal product were prepared as described in Example 1. 11.25 g of *Brassica juncea* product was blended with 3.75 g of *Sinapis alba* product (i.e., 3:1 (w/w)) to obtain a blended product, and diluted in water and complemented with 0.022 gr/l of ascorbic acid. Potato dextrose agar (PDA) medium was prepared to include five different final quantities of the blended product therein (6.5 g blended product/100 ml; 6.75 g blended product/100 ml; 7.0 g blended product/100 ml; 7.25 g blended product/100 ml; and 7.5 g blended product/100 ml). It is noted that the PDA mixtures correspond with an application range of 13-15 kg/ha at a 3:1 (w/w) of *Brassica juncea* product to *Sinapis alba* product. Control PDA did not include the mustard meal preparation. The PDA medium was used to prepare agar petri dish plates. The PDA plates were then centrally inoculated with a strain of *Fusarium oxysporum* f. sp. *cubense* (Foc) TR4 (Foc TR4) isolated from a soil sample serving as a growth substrate of a diseased banana plant. For each of the tested concentrations of mustard meal, as well as the control, 5 replica plates were prepared. The plates were incubated at a temperature of 28° C. in the dark for 5 days. The mean radial growth of Foc TR4 was then determined following five days of incubation. The results are shown in Table 1 below.

TABLE 1

| Fusarium Radial Growth Fusarium Radial Growth (cm) | | | | | | |
|---|---|---|---|---|---|---|
| | 0 g/ml | 6.5 g/ml | 6.75 g/ml | 7.0 g/ml | 7.25 g/ml | 7.5 g/ml |
| Replica 1 | 2.6 | 0 | 0 | 0 | 0 | 0 |
| Replica 2 | 2.6 | 0 | 0 | 0 | 0 | 0 |
| Replica 3 | 2.5 | 0 | 0 | 0 | 0 | 0 |
| Replica 4 | 2.4 | 0 | 0 | 0 | 0 | 0 |
| Replica 5 | 2.4 | 0 | 0 | 0 | 0 | 0 |
| Average | 2.5 | 0 | 0 | 0 | 0 | 0 |

Example 3—Field Trial: Control of *Fusarium* sp. in Banana Plantation Soil Using a Particulate *Brassica juncea* (B. *Juncea*) Plant Material in Combination with *Sinapis alba* (*S. alba*) Meal A banana plantation was used to evaluate the efficacy of a particulate mustard plant material in combination with *S. alba* meal in controlling the levels of FOC in the soil. The land area was divided into 30 plots with 6 treatments and 5 replicates per treatment. Treatments and replicates were assigned to the plots using a completely randomized block design.

The dry particulate mustard plant material (*B. juncea*) and the dry *S. alba* product were prepared as described in example 1. The dry particulate mustard plant material was solubilized in 1.75 parts of glycerin (volume:weight ratio) plus 0.75 parts water (volume:weight ratio) to produce the liquid particulate mustard plant material. The liquid particulate mustard plant material was mixed with dry *S. alba* meal at a ratio of 4 parts liquid particulate mustard plant material to 1 part of dry *S. alba* meal and the mixture was further diluted with 10 parts of water (volume:volume ratio). The diluted mixture was then applied to the experimental plots to deliver the wet product at the intended concentrations (concentrations shown in Table 2 as litres of wet product prior to the final dilution with water).

TABLE 2

| Product application rates | |
|---|---|
| Treatment # | Treatment |
| 1 | Control (0 L/Ha) |
| 2 | 80 L/Ha |
| 3 | 160 L/Ha |
| 4 | 240 L/Ha |
| 5 | 320 L/Ha |
| 6 | 400 L/Ha |

Soil samples (200 g) were taken from each plot in four sub-samples of 50 g each at 20 cm depth near the area of greatest root activity of the banana plants. The sub-samples were combined, homogenized, and then assayed for colony forming units (CFUs) of *Fusarium* sp. on potato dextrose agar.

Control of soil *Fusarium* sp. was indicated by the difference in soil CFU/g prior to and 21 days following application of the various treatments. Results are shown in Table 3 below.

TABLE 3

| *Fusarium* control in banana plantation soil | |
|---|---|
| Treatment | Initial Soil CFUs (prior to treatment) minus Final Soil CFUs (21 days after treatment)* |
| Control | −200 |
| 80 L/Ha | 400 |
| 160 L/Ha | 600 |
| 240 L/Ha | 600 |
| 320 L/Ha | 1000 |
| 400 L/Ha | 1200 |

*Statistically significant dose dependent control of *Fusarium* sp. CFU in banana plantation soil.

In the control untreated soils, the level of contamination by *Fusarium* sp. increased over the 21 days of the field trial (a negative value in Table 3 signifies an increase in *Fusarium* contamination during the field trial period). In comparison, application of mustard particulate plant material resulted in a statistically significant reduction in the level of *Fusarium* sp. in the soil (a positive value in Table 3 signifies a decrease in *Fusarium* contamination during the field trial period) with clear evidence of a dose dependent effect.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

The invention claimed is:

1. A method for controlling *Fusarium* wilt of a banana plant belonging to the Cavendish cultivar group, the method comprising applying to the banana plant or growth medium of the banana plant a fungicidally effective amount of a composition comprising a mixture of a *Brassica* seed meal comprising glucosinolate, a *Sinapis* seed meal comprising myrosinase, and water, wherein the glucosinolate is hydrolyzed by the catalytic activity of the myrosinase to form glucosinolate hydrolysate comprising thiocyanate or isothiocyanate, wherein the *Fusarium* wilt is caused by *Fusarium oxysporum* f. sp. *cubense* (Foc) Tropical race 4 (TR4).

2. The method according to claim 1, wherein the thiocyanate comprises allyl thiocyanate (ATC) or allyl isothiocyanate (AITC).

3. The method according to claim 1, wherein the composition further comprises a carrier, excipient, or diluent, and further optionally comprises ascorbate or glycerine.

4. The method according to claim 1, wherein the mixture comprises from about 60% (w/w) up to about 99% (w/w) *Brassica juncea* seed meal, from about 1% (w/w) up to about 40% (w/w) *Sinapis alba* seed meal, and water.

5. The method according to claim 1, wherein the *Brassica* seed meal comprising glucosinolate is *Brassica juncea* seed meal glucosinolate comprising sinigrin and the composition comprises *Brassica juncea* glucosinolate hydrolysate.

6. The method according to claim 1, wherein the composition comprises the glucosinolate hydrolysate comprising from about 0.4 mg/ml to about 50 mg/l thiocyanate or isothiocyanate.

7. The method according to claim 1, wherein the composition comprises a *Brassica juncea* glucosinolate hydrolysate and a *Sinapis alba* myrosinase complex, the hydrolysate having been formed by hydrolysis of *Brassica juncea* glucosinolate, wherein the hydrolysis is catalyzed by the *Sinapis alba* myrosinase complex.

8. The method according to claim 5, wherein the composition comprises 1 to 10,000 *Sinapis alba* myrosinase activity units per gram of sinigrin.

9. The method according to claim 5, wherein the *Sinapis* seed meal comprising myrosinase is *Sinapis alba* seed meal comprising myrosinase, the composition comprises 1 to 10,000 myrosinase activity units per gram of sinigrin, and the composition is applied at a rate of from about 10 to about 800 liters per hectare.

10. The method according to claim 5, wherein the *Sinapis* seed meal comprising myrosinase is *Sinapis alba* seed meal comprising myrosinase, the composition comprises 10 to 1,000 myrosinase activity units per gram of sinigrin, and the composition is applied at a rate of from about 10 to about 800 liters per hectare.

11. The method according to claim 1, wherein the growth medium is soil or a tissue culture medium.

12. The method according to claim 1, wherein the composition is applied by spraying, drenching, or irrigating.

* * * * *